United States Patent
Ahluwalia et al.

(10) Patent No.: US 7,426,389 B2
(45) Date of Patent: Sep. 16, 2008

(54) METHOD AND APPARATUS FOR IMPLEMENTING DIRECT ROUTING

(75) Inventors: Mankesh S. Ahluwalia, Hoffman Estates, IL (US); Chandra Warrier, Schaumburg, IL (US)

(73) Assignee: UTStarcom, Inc., Alameda, CA (US)

( * ) Notice: Subject to any disclaimer, the term of this patent is extended or adjusted under 35 U.S.C. 154(b) by 456 days.

(21) Appl. No.: 10/966,018

(22) Filed: Oct. 15, 2004

(65) Prior Publication Data

US 2006/0083241 A1     Apr. 20, 2006

(51) Int. Cl.
*H04Q 7/20* (2006.01)
(52) U.S. Cl. .................. 455/433; 370/328; 370/351; 709/238
(58) Field of Classification Search ................ 370/351, 370/392, 401, 328, 331, 338; 709/202, 238–242; 455/432.1, 433
See application file for complete search history.

(56) References Cited

U.S. PATENT DOCUMENTS

| | | | |
|---|---|---|---|
| 6,542,992 B1 * | 4/2003 | Peirce et al. | 713/153 |
| 6,580,704 B1 | 6/2003 | Wellig et al. | |
| 7,020,465 B2 | 3/2006 | O'Neill | |
| 2003/0018810 A1 * | 1/2003 | Karagiannis et al. | 709/238 |
| 2005/0243840 A1 * | 11/2005 | Sivalingam et al. | 370/401 |

OTHER PUBLICATIONS

Gustafsson et al., "Requirements on Mobile IP from a Cellular Perspective," Mobile IP Working Group, Internet-Draft, <draft-ietf-mobileip-cellular-requirements-00.txt>, dated Feb. 1999.
International Search Report and Written Opinion from International Application No. PCT/US05/036221, dated Oct. 12, 2006.

* cited by examiner

*Primary Examiner*—Edward Urban
*Assistant Examiner*—Raymond S. Dean

(57) ABSTRACT

A method and apparatus are provided for implementing direct routing. An Internet Protocol (IP) packet sent from a first mobile node to a second mobile node is received at a foreign agent for a foreign network, wherein both the first and second mobile nodes are visiting the foreign network. It is determined that the second mobile node is visiting the foreign network. The packet is routed to the second mobile node over a communication path that does not include a home agent associated with the second mobile node.

35 Claims, 6 Drawing Sheets

METHOD AND APPARATUS FOR IMPLEMENTING DIRECT ROUTING

BACKGROUND

1. Technical Field

The claims and examples of embodiments relate to the Mobile Internet Protocol (Mobile IP) and, more particularly, to implementing direct routing.

2. Description of Related Art

Increasingly, people are connecting to the Internet using mobile devices. For example, laptop computers are used by business travelers from many locations, and cellular telephones and personal digital assistants are used by people from many locations to access information about such topics as sports and weather. To accomplish this communication, these devices typically connect—physically or wirelessly—to a network that has been established wherever they are.

To handle this mobility, a protocol known as the Mobile Internet Protocol ("Mobile IP") was developed, enabling these mobile devices ("mobile nodes") to maintain a static or at least semi-permanent Internet Protocol (IP) address, to which other devices can transmit data bound for the mobile nodes, no matter where the mobile nodes happen to be currently attached to the Internet. Relevant aspects of Mobile IP are described in RFC 3344, "IP Mobility Support for IPv4" (August 2002), which is incorporated herein by reference.

In Mobile IP, each mobile node has a "home network," on which sits a device known as the mobile node's home agent (HA). Under standard IP routing, all data addressed to a mobile node will be routed to the mobile node's HA. When the mobile node is on its home network, the HA will transmit any such data to the mobile node, as would a typical router. When a mobile node is on another network, known as a "foreign network," the mobile node informs the HA of its location. In that case, the HA transmits any data addressed to the mobile node to a device on the foreign network known as a foreign agent (FA), which delivers the data to the mobile node. The FA also routes data sent from the mobile node over the Internet to its intended destination.

SUMMARY

A method and apparatus are provided for implementing direct routing. One example of an embodiment may take the form of a method. In accordance with the method, an Internet Protocol (IP) packet sent from a first mobile node to a second mobile node is received at a foreign agent for a foreign network, wherein both the first and second mobile nodes are visiting the foreign network. It is determined that the second mobile node is visiting the foreign network. The packet is routed to the second mobile node over a communication path that does not include a home agent associated with the second mobile node.

These as well as other aspects and advantages will become apparent to those of ordinary skill in the art by reading the following detailed description, with reference where appropriate to the accompanying drawings.

BRIEF DESCRIPTION OF THE DRAWINGS

Various examples of embodiments are described herein with reference to the following drawings, wherein like numerals denote like entities.

DETAILED DESCRIPTION OF THE DRAWINGS

1. Overview

Figure 1:
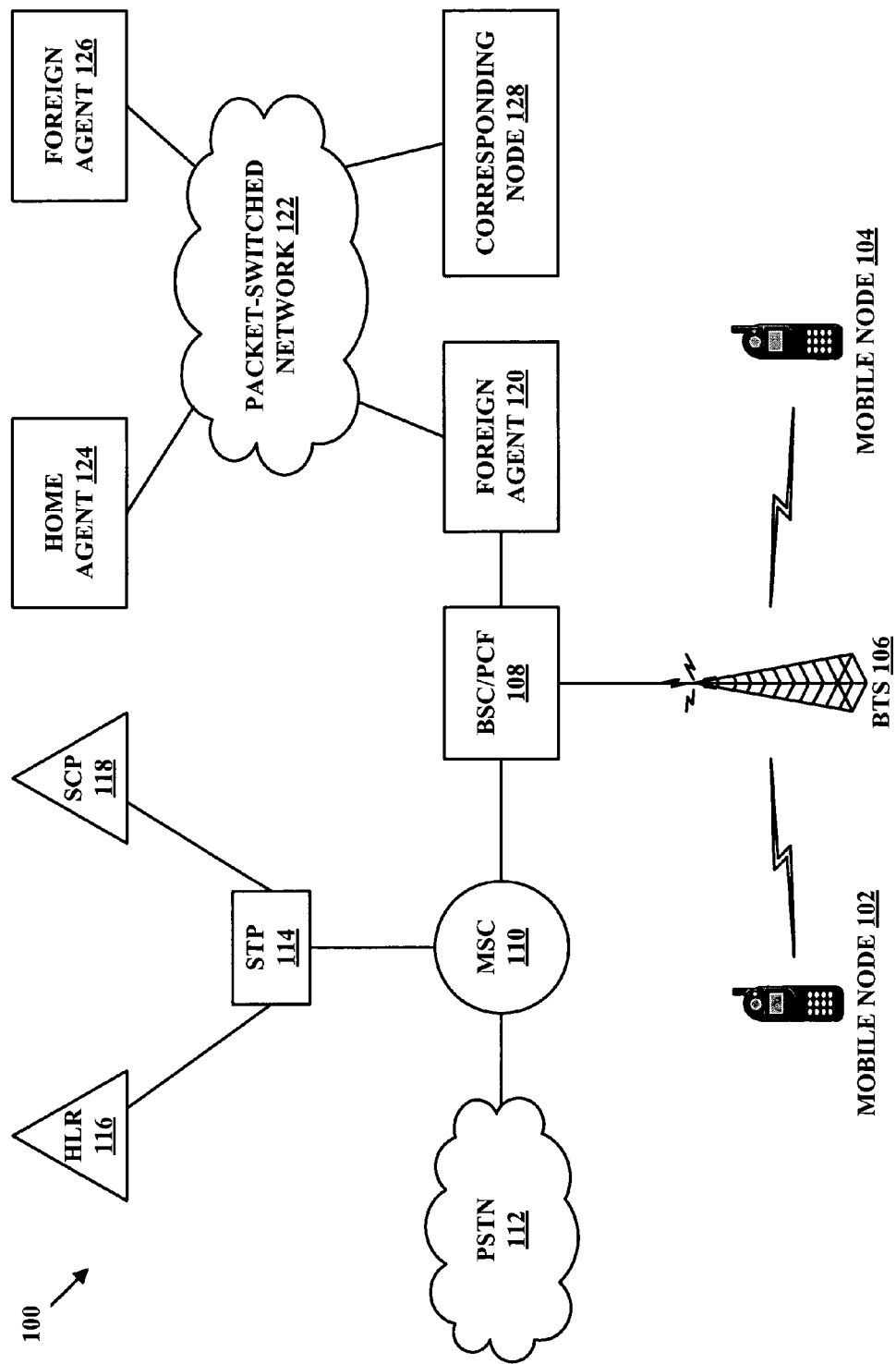
FIG. 1 is a simplified block diagram of an example of a communications system, in accordance with examples of embodiments.

In Mobile IP, each mobile node (laptop, cell phone, etc.) is assigned a "home network," which will typically be the network on which the mobile node was provisioned for service, and would typically have a presence geographically close to where the user of the mobile node lives. On the home network sits an entity known as a "home agent." The home agent (HA) maintains data records for each mobile node that calls that particular network their home network. Among other data, for each mobile node, the home agent will store a "home address," which is the IP address associated with the mobile node on at least a semi-permanent basis. Entities seeking to transmit data to a mobile node may thus transmit the data to the mobile node's home address, and may query the home agent to discover this home address if necessary.

When a mobile node connects to a network other than its home network, that network is referred to as a "foreign network" with respect to the mobile node. An entity on the foreign network known as a "foreign agent" (FA) facilitates the mobile node's use of the foreign network. The mobile node typically begins the process of establishing connectivity via a foreign network by establishing a data link, or point-to-point protocol (PPP) connection, with an entity known as a packet data serving node (PDSN) on the foreign network. The FA is typically a functional part of the PDSN. The mobile node then requests registration as a visiting mobile node by sending a "Mobile Registration Request" message over the PPP connection to the FA.

The registration request typically includes an indication of the IP address of the mobile node's HA, to which the FA will then transmit the request. If the HA approves the request, it will transmit a "Mobile Registration Reply" message back to the FA, indicating approval. The HA will also store an association—known as a "mobility binding"—between the home address of the mobile node (which the HA may concurrently assign to the mobile node) and the IP address of the FA. Upon receiving the reply, the FA adds an entry for the mobile node to a "visitor list" of currently-registered mobile nodes maintained by the FA, usually storing the mobile node's IP address in the visitor-list entry. To complete the registration process, the FA transmits the reply to the mobile node, indicating success.

Once registration has taken place, not only may the mobile node transmit IP packets over the Internet via the foreign agent, the mobile node may now receive IP traffic sent to the mobile node's home address via "IP encapsulation" or "tunneling," described in RFC 2003, "IP Encapsulation within IP" (October 1996), which is incorporated herein by reference. IP encapsulation builds on the fact that, due to standard IP routing and addressing, IP traffic addressed to the mobile node's home address will be routed to the mobile node's HA. For any mobile nodes for which the HA is currently maintaining an unexpired mobility binding, the HA will intercept this traffic and route it to the FA indicated by the respective mobility binding.

The HA "encapsulates" or "tunnels" the data to the indicated FA by adding an "outer IP header" to each packet. The outer IP header will indicate the HA as the source address and the FA's IP address as the destination address, essentially treating the combined header and payload of the original packets as the payload of the new packets. Upon receipt of the encapsulated packets, the FA "decapsulates" them by removing the outer IP header, and delivers them to the visiting mobile node over the previously-established PPP connection. Another encapsulation scheme that could be used is Generic Routing Encapsulation, described in RFC 1701, "Generic Routing Encapsulation (GRE)" (October 1994), which is incorporated herein by reference.

In addition to enabling a visiting mobile node to receive packets addressed to the mobile node's home IP address, the foreign agent enables the visiting mobile node to send packets over the Internet. Foreign agents typically accomplish this via standard IP routing. That is, when a visiting mobile node transmits a packet to another entity, the FA will route the packet out on to the Internet, where standard IP routing mechanisms will transport that packet to its destination.

Thus, inefficiencies arise when a visiting mobile node transmits packet data to a second mobile node that is currently also visiting the same foreign network. The packets will be routed from the FA to the second mobile node's HA (which may or may not also be the sending mobile node's HA). The second mobile node's HA will refer to the mobility binding for the second mobile node, and accordingly route the data right back to the FA on the foreign network that both mobile nodes are currently visiting. To complete this near round trip, the FA then decapsulates the data, and delivers it to the second mobile node.

In one embodiment, when an FA receives packet data transmitted by a visiting mobile node, the FA will check whether the intended destination of that data is another mobile node that is also currently registered on the FA's visitor list. If so, the FA routes the packet data directly to the second mobile node, using the PPP connection that would have been previously established with the second mobile node. If not, the FA routes the data out on to the Internet as usual.

2. Example Architecture a. Example Communications System

FIG. 1 is a simplified block diagram of an example of a communications system, in accordance with examples of embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, the communications system 100 includes a mobile node 102, a mobile node 104, a base transceiver station (BTS) 106, a base station controller/packet control function (BSC/PCF) 108, a mobile switching center 110, a Public Switched Telephone Network (PSTN) 112, a signal transfer point (STP) 114, a home location register (HLR) 116, a service control point (SCP) 118, a foreign agent (FA) 120, a packet-switched network 122, a home agent (HA) 124, an FA 126, and a corresponding node 128. The entities shown in FIG. 1 are illustrative; for example, there could be any number of foreign agents in communication with the network 122, and any number of mobile nodes in communication with each FA, whether via a BTS and BSC/PCF, or via some other connection, such as an Ethernet cable.

The packet-switched network 122 may include one or more wide area networks (WANs), one or more local area networks (LANs), one or more public networks such as the Internet, and/or one or more private networks. Devices in communication with the network. 122, such as the foreign agent 120, may transmit and receive data using a packet-switched protocol such as the Internet Protocol (IP), and may be identified by an address such as an IP address.

The mobile nodes 102 and 104 may be any devices (i) capable of engaging in packet-data communication and (ii) arranged to function as mobile nodes, as that term is used in the art with respect to Mobile IP. The mobile nodes 102 and 104 are each associated with a home agent (which could be the same HA for both mobile nodes, or a separate HA for each mobile node), such that the mobile nodes 102 and 104 may alter their respective points of attachment to the Internet while maintaining a semi-permanent "home" IP address, as described above.

As examples, either or both of the mobile nodes 102 and 104 may be a cellular telephone, a personal digital assistant (PDA), a computer, a desktop computer, or a laptop computer. Either or both of the mobile nodes 102 and 104 may also themselves be a foreign agent, arranged to serve some number of other mobile nodes. As further examples, either or both of the mobile nodes 102 and 104 could be a router, such as a wireless router. The mobile nodes 102 and 104 may take other forms as well, without departing from the scope of the claims.

In the examples of embodiments described herein, the mobile nodes 102 and 104 are cellular telephones capable of packet-data communication. For clarity, this description refers at times only to the mobile node 102, though the description applies equally to the mobile node 104 as well. To provide service to the mobile node 102, the communications system 100 includes the BTS 106, which provides a wireless coverage area, and communicates over a wireless air interface with the mobile node 102, located in the wireless coverage area.

The communication between the BTS 106 and the mobile node 102 may occur in a digital format, such as Code Division Multiple Access (CDMA), Time Division Multiple Access (TDMA), Global System for Mobile Communications (GSM), 3rd Generation (3G) wireless communications, or Institute of Electrical and Electronics Engineers (IEEE) 802.11x, or an analog format, such as Advanced Mobile Phone Service (AMPS). Some examples of embodiments may use the digital format known as cdma2000®, described in "CDMA 2000® Series," TIA/EIA/IS-2000 Series, Release A (2000), which is incorporated herein by reference.

The BTS 106 may be controlled by the BSC/PCF 108, which, in turn, may be controlled by the MSC 110. The MSC 110 may be connected to the PSTN 112. The MSC 110 may use a signaling system, such as SS7, to route calls through the PSTN 112. The MSC 110 may be able to communicate with the HLR 116 and the SCP 118, typically via one or more STPs, such as the STP 114. And although FIG. 1 shows the MSC 110 connected to one BSC/PCF and shows the BSC/PCF 108 connected to one BTS, in general, the MSC 110 may be connected to more than one BSC/PCF and each BSC/PCF may be connected to more than one BTS.

The mobile node 102 uses the MSC 110 and the HLR 116 for authentication for access to wireless resources. When the mobile node 102 requests a wireless traffic channel, the MSC 110 may send an authentication request to the HLR 116. The signaling between the MSC 110 and the HLR 116 may conform to "Cellular Radiotelecommunications Intersystem Operations," ANSI/TIA/EIA-41-D-97 (December 1997) and "Addendum 1" thereto, ANSI/TIA/EIA/41-D-1-2002 (April 2002), which are incorporated herein by reference. The signaling between the MSC 110 and the SCP 118 may conform to "Wireless Intelligent Network," TIA/EIA/IS-771 (July 1999), and "Addendum 1" thereto, TIA/ELA/IS-771-1 (August 2001), which are incorporated herein by reference. And other signaling protocols may be used as well.

To enable the mobile node 102 to engage in packet-data communication over the packet-switched network 122, the BSC/PCF 108 includes a packet control function (PCF), and the FA 120 connects the BSC/PCF 108 to the network 122. The FA 120 may be a functional component of a packet data serving node (PDSN), which is an entity known to those in the art. As such, this description at times refers to the FA 120 as "the PDSN/FA 120" with respect to functions typically carried out by a PDSN. The communication between the BSC/PCF 108, the MSC 110, and the PDSN/FA 120 may conform to "Wireless IP Network Standard," 3GPP2 P.S0001-A v3.0 (July 2001) and "Interoperability Specification (IOS) for cdma2000 Access Network Interfaces," 3GPP2 A.S0011~17-A v2.0.1 (December 2003), which are incorporated herein by reference.

Briefly, under these specifications, the mobile node 102 may request access to the network 122 by sending a packet-data origination request to the MSC 110. The MSC 110 then signals to the BSC/PCF 108, which in turn signals to the PDSN/FA 120. The PDSN/FA 120 and the mobile node 102 then negotiate to establish a data link. If this is successful, a data link, such as a point-to-point protocol (PPP) connection, is established between the mobile node 102 and the PDSN/FA 120. The PDSN/FA 120 may then act as a network access server, providing the mobile node 102 access to the packet-switched network 122. Alternatively or additionally, other network elements—such as an interworking function (IWF) between the MSC 110 and the network 122—may be present for providing the mobile node 102 access to the network 122.

The mobile node 102 would typically be identified on the network 122 by a network address, such as an IP address, which may be dynamically assigned using a Mobile IP process, in which the PDSN/FA 120 may transmit, via the network 122, a registration request to a home agent, such as the HA 124, associated with the mobile node 102. If the HA 124 approves the request, the HA 124 may dynamically assign an IP address to the mobile node 102, or the mobile node 102 may use an IP address permanently assigned to it. The foreign agents 120 and 126, and the HA 124, are explained in connection with FIG. 2. The corresponding node 128 may be any device capable of engaging in packet-data communication over the network 122. As examples, the corresponding node 128 may be a network server, a mobile node, a computer, a PDA, etc.

b. Example Foreign Agent

Figure 2:
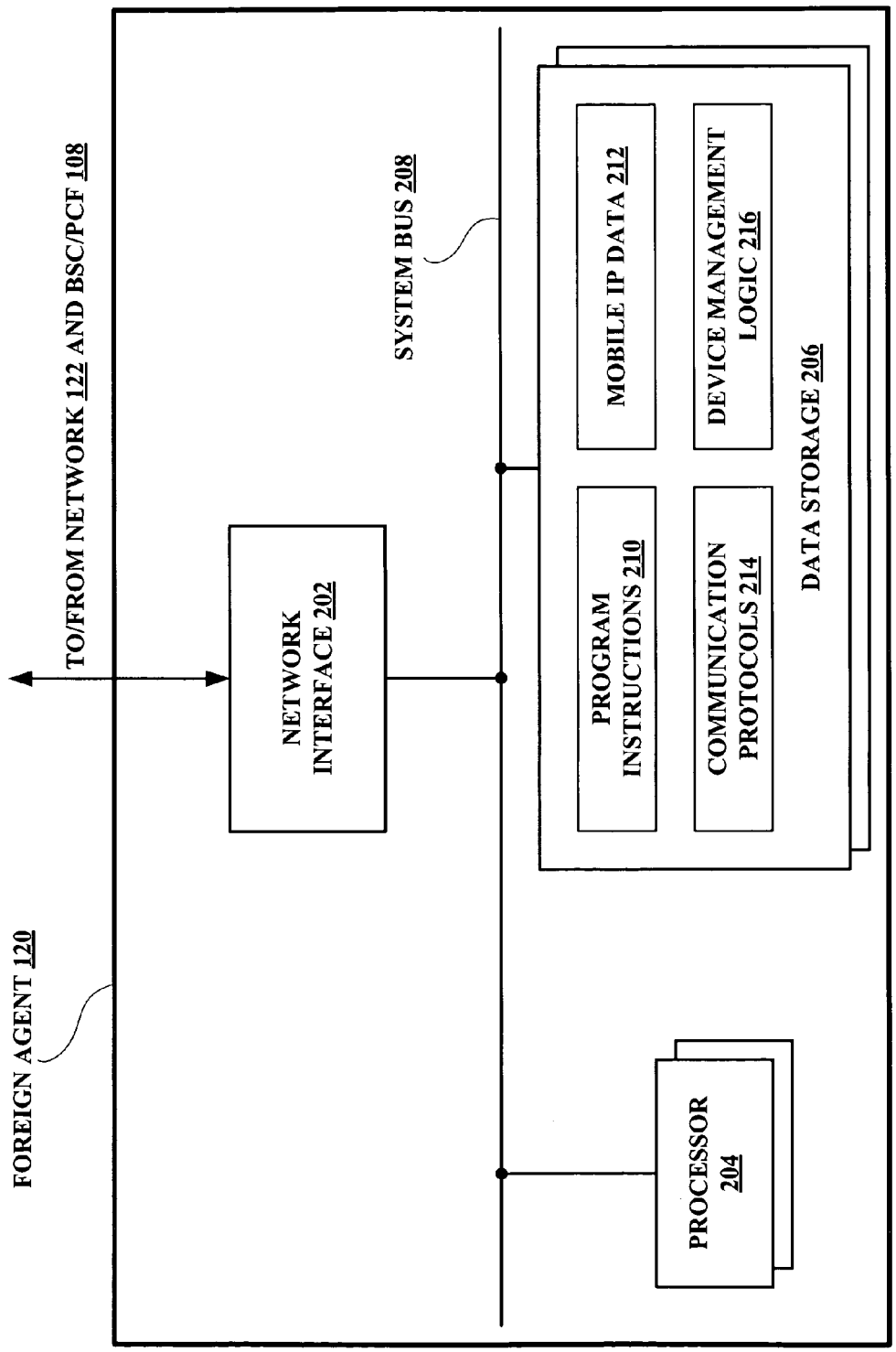
FIG. 2 is a simplified block diagram of an example of a foreign agent, in accordance with examples of embodiments.

FIG. 2 is a simplified block diagram of an example of a foreign agent, in accordance with examples of embodiments. In particular, FIG. 2 is a diagram of the FA 120 of FIG. 1. The FA 120 includes a network interface 202, a processor 204, and a data storage 206, all of which may be communicatively linked by a system bus 208. As stated, the FA 120 may be situated in a PDSN, and may be referred to at times herein as the PDSN/FA 120. In general, the FA 120 may be any computing device programmed to carry out the functions described herein.

The network interface 202 enables the FA 120 to communicate over the network 122 and with the BSC/PCF 108, and may include an Ethernet adapter. Alternatively or additionally, the FA 120 may communicate wirelessly, in which case the network interface 202 may include a wireless-communication chipset and antenna. The network interface 202 may also include circuitry to communicate locally with other devices over a physical connection such as an Ethernet cable, or a wireless connection such as a wireless LAN, using a protocol such as IEEE 802.11x, or perhaps using Bluetooth® technology. Those devices, such as routers and/or modems, may then communicate with the BSC/PCF 108 and with entities on the network 122.

The processor 204 may control many of the operations of the FA 120 by executing a set of instructions 210 stored in the data storage 206, and may comprise multiple (e.g., parallel) processors, such as a general purpose microprocessor and/or a discrete digital signal processor.

The data storage 206 may store the program instructions 210, a set of Mobile IP data 212, a set of communication protocols 214, and a set of device management logic 216. The data storage 206 may take various forms, in one or more parts, such as a non-volatile storage block and/or a removable storage medium. The program instructions 210 may comprise program instructions executable by the processor 204 to carry out various functions described herein.

The communication protocols 214 may be necessary to receive data from and send data to the BSC/PCF 108, and to receive and send data over the network 122, and may include Session Initiation Protocol (SIP), HyperText Transfer Protocol (HTTP), Real-Time Transport Protocol (RTP), Transmission Control Protocol (TCP), User Datagram Protocol (UDP), Internet Protocol (IP), Simple Mail Transfer Protocol (SMTP), Dynamic Host Configuration Protocol (DHCP), Domain Name Service (DNS), Internet Control Message Protocol (IMCP), Point-to-Point Protocol (PPP), IEEE 802.11x, Bluetooth®, cdma2000®, multiple proprietary protocols, and any other communication protocols. Compatible protocols may be stored in the BSC/PCF 108, and in other entities in communication with the network 122. The device management logic 216 may be used to manage aspects of the FA 120 such as memory and file management.

The Mobile IP data 212 may include a visitor list maintained by the FA 120, as described above. In particular, the visitor list would include an entry for each mobile node, such as the mobile nodes 102 and 104, for which the FA 120 is currently serving as a foreign agent. Devices in communication with the network 122, such as the corresponding node 128, would thus be able to transmit packet data to any mobile node on the FA 120's visitor list. This packet data would be routed to a home agent associated with the particular mobile node, and then to the FA 120, which would deliver the data to the proper mobile node over an established PPP connection. If the FA 120 receives data from one mobile node on its visitor list, such as the mobile node 102, that is destined for another mobile node on its visitor list, such as the mobile node 104, the FA 120 includes program instructions to cause the FA 120 to route that data over the PPP connection that was previously established with the mobile node 104, without routing the data through the mobile node 104's home agent, which may or may not be the HA 124.

The foreign agent 126 and the home agent 124 may have functional components similar to those described with respect to the foreign agent 120. One difference, however, would be the contents of the Mobile IP data 212. In the case of the foreign agent 126, this area of data storage would also contain a visitor list, but that visitor list would include entries for whichever mobile nodes were currently using the FA 126 as their FA.

In the case of the HA 124, the Mobile IP data 212 would include mobility bindings for each mobile node that (i) uses the HA 124 as their HA and (ii) is currently using an FA such as the FA 120 to engage in packet-data communication. For example, if the HA 124 is the HA for the mobile node 104, and the mobile node 104 is currently using the FA 120 to engage in packet-data communication, the Mobile IP data 212 in the data storage 206 of the HA 124 would include a mobility binding that associates the home IP address of the mobile node 104 with the IP address of the FA 120. The HA 124 would route packet data received by the HA 124 for the mobile node 104 to the FA 120, which would then deliver the packets to the mobile node 104.

3. Example Operation a. Example Methods i. A First Example Method

Figure 3:
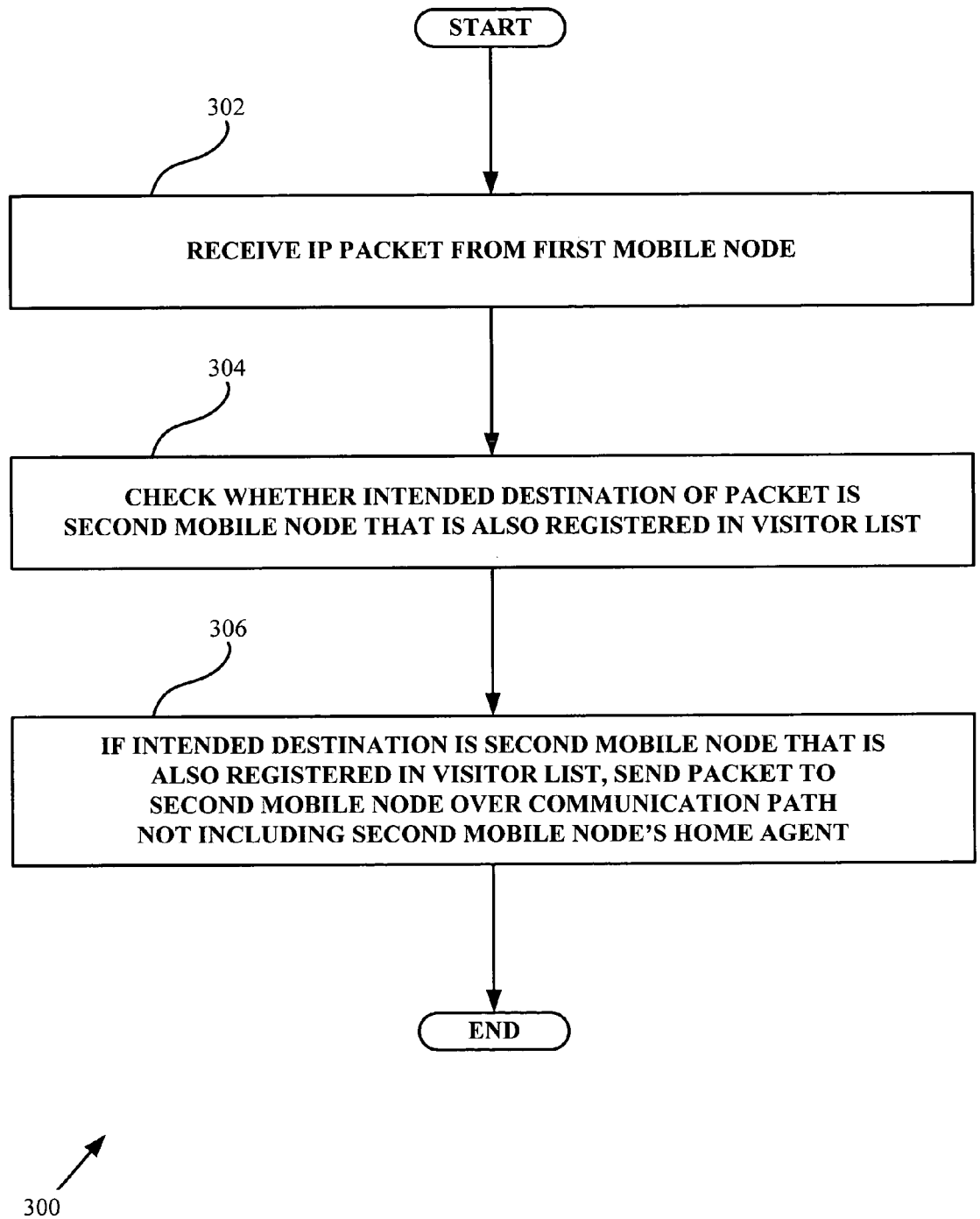
FIG. 3 is a flowchart of an example of an embodiment, in the form of a method carried out along the communications system of FIG. 1.

FIG. 3 is a flowchart of an example of an embodiment, in the form of a method carried out along the communications system of FIG. 1. As shown in FIG. 3, the method 300 begins, at step 302, when the foreign agent 120 receives an IP packet from the mobile node 102. In the example of FIG. 3, the mobile node 102 is using the FA 120 to engage in packet-data communication over the network 122. An entry corresponding to the mobile node 102 will thus be stored in the visitor list maintained by the FA 120.

The packet received by the FA 120 at step 302 will include an indication of the packet's intended destination. Here, the indication is stored in the Destination IP Address field of the packet's IP header, and is equal to the home address of the mobile node 104, which is also using the FA 120 to engage in packet-data communication. Thus, an entry corresponding to the mobile node 104 will also be stored in the visitor list maintained by the FA 120, and because the HA 124 is the mobile node 104's HA, a mobility binding associating the home address of the mobile node 104 and the IP address of the FA 120 will be stored by the HA 124.

At step 304, the FA 120 checks whether the intended destination of the IP packet is a second mobile node that is also registered in the FA 120's visitor list. The FA 120 may make this determination by comparing the intended destination of the packet with each entry on the FA 120's visitor list. The visitor list may be sorted by IP address to expedite this comparison. As explained above, in this example, the packet is bound for the mobile node 104; thus, the FA 120 will answer the inquiry of step 304 in the affirmative.

Accordingly, at step 306, the FA 120 sends the packet to the mobile node 104 over a communication path that does not include the HA 124, which is the HA associated with the mobile node 104. To include the HA 124 would be inefficient, as the packet would be routed right back to the FA 120, due to the mobility binding maintained by the HA 124. The FA 120 thus transmits the packet to the mobile node 104 over the previously-established PPP connection. As a result, (i) the packet arrives at the mobile node 104 more quickly than it would have had the packet been routed to the mobile node 104 via the HA 124, (ii) congestion is reduced along network paths between the FA 120 and the HA 124, (iii) congestion is reduced at the HA 124 itself, and (iv) the amount of processing required by the HA 124 is reduced.

ii. A Second Example Method

Figure 4:
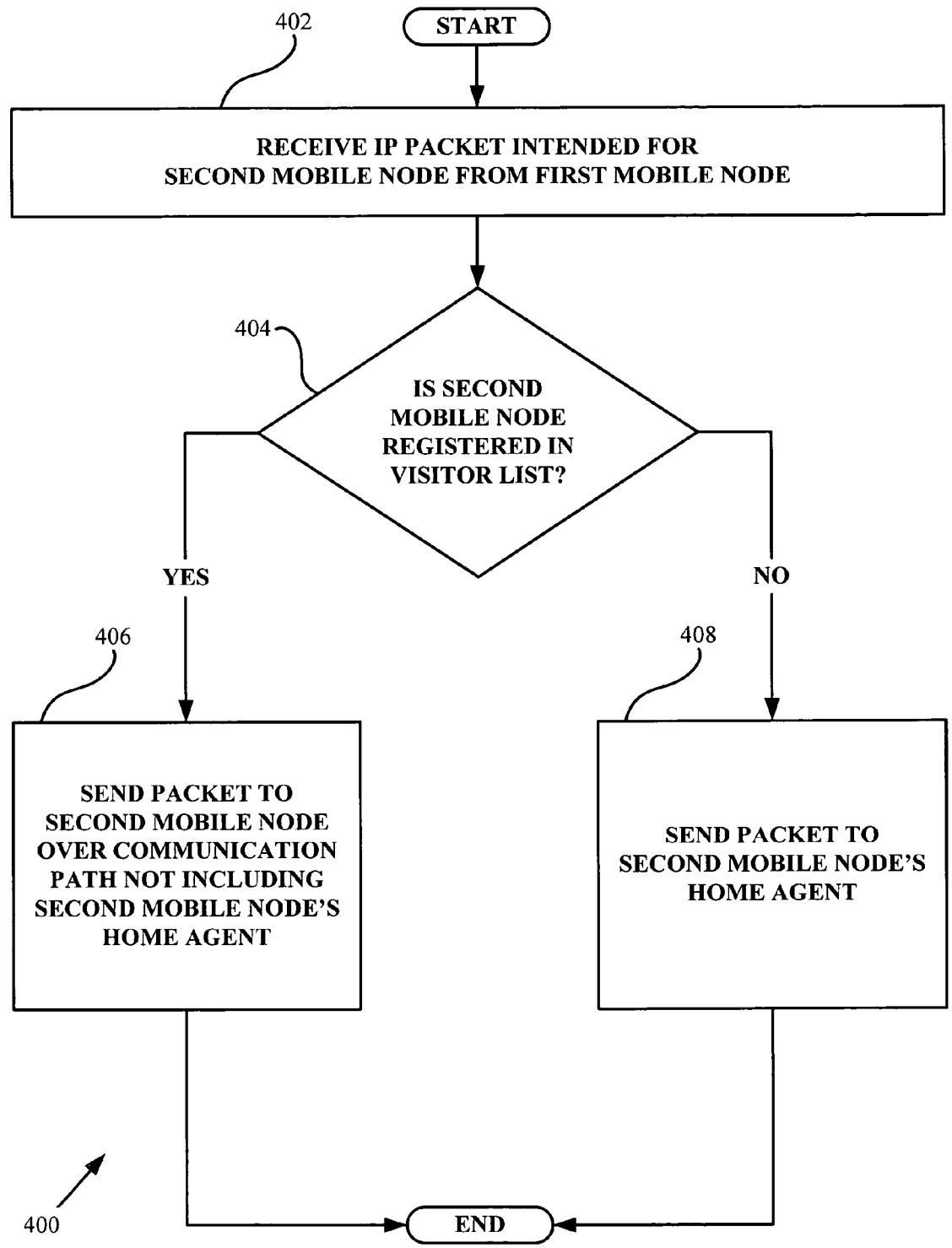
FIG. 4 is a flowchart of an example of an embodiment, in the form of a method carried out along the communications system of FIG. 1.

FIG. 4 is a flowchart of an example of an embodiment, in the form of a method carried out along the communications system of FIG. 1. As shown in FIG. 4, the method 400 begins, similar to the beginning of the method 300 of FIG. 3, at step 402, when the foreign agent 120 receives an IP packet from the mobile node 102. As in the example of FIG. 3, the mobile node 102 is currently using the FA 120 to engage in packet-data communication, and thus the mobile node 102 is registered in the visitor list maintained by the FA 120. The IP packet includes the home address of the mobile node 104 in the Destination IP Address field of the IP packet header.

At step 404, the FA 120 checks whether the mobile node 104 is also registered in the FA 120's visitor list. In the example of FIG. 4, as in the example of FIG. 3, the mobile node 104 is currently using the FA 120 to engage in packet-data communication and thus, the mobile node 104 will also be registered in the FA 120's visitor list. And, as in FIG. 3, the HA 124 is the mobile node 104's home agent. Thus, the HA 124 will store a mobility binding that associates the home address of the mobile node 104 with the IP address of the PDSN/FA 120.

At step 406, because the mobile node 104 is registered in the visitor list of the FA 120, the FA 120 sends the packet to the mobile node 104 over a communication path that does not include the home agent 124. More particularly, the FA 120 sends the packet to the mobile node 124 over the PPP connection that had earlier been established between the PDSN/FA 120 and the mobile node 104. As with the method 300 of FIG. 3, this will result in reduced delivery time, reduced congestion, and reduced processing.

Figure 5:
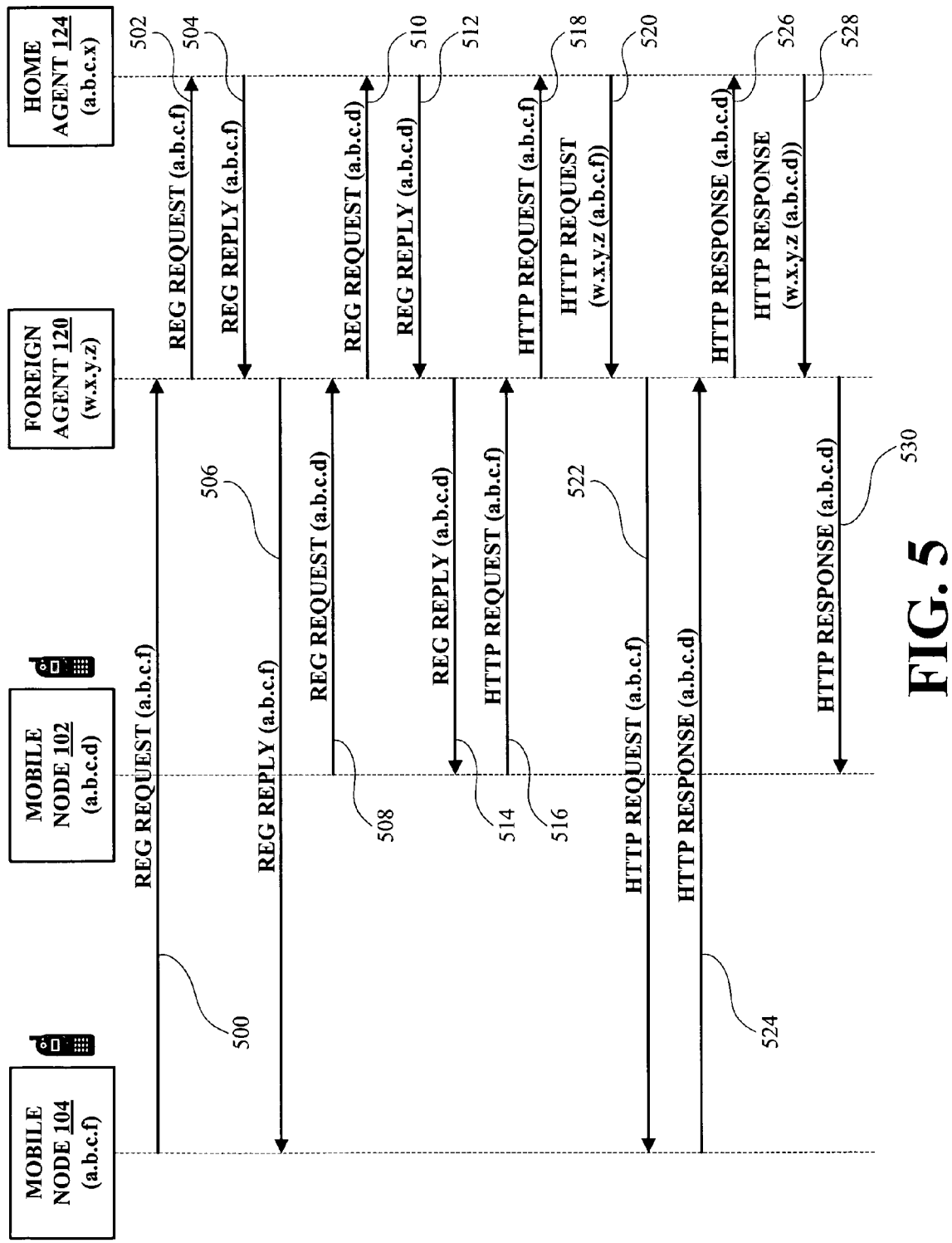
FIG. 5 is a call flow diagram, illustrating the messaging and processing that would occur if direct routing were not implemented.

Now, if the mobile node 104 is not registered in the visitor list of the FA 120 at the time the FA 120 receives the packet from the mobile node 102, that is, if the mobile node 104 is on its home network, on another foreign network, or not currently on any network, the FA 120 would act differently. As an example, the mobile node 104 could be using the FA 126 to engage in packet-data communication. In that case, the FA 126 would store an entry on its visitor list corresponding to the mobile node 104, and the HA 124 would store a mobility binding associating the home address of the mobile node 104 and the IP address of the FA 126. In that case, the FA 120, after receiving the packet from the mobile node 102 at step 402, would have determined that the question posed at step 404 is correctly answered in the negative. Therefore, at step 408, the FA 120 would tunnel the packet to the home agent 124, for tunneling to the mobile node 104 via the FA 126, in accordance with Mobile IP standards.

b. Example Call Flow i. Example Call Flow Where Direct Routing is Not Implemented FIG. 5 is a call flow diagram, illustrating the messaging and processing that would occur if direct routing were not implemented. In particular, the call flow of FIG. 5 shows some of the messaging that would occur between the time that neither the mobile node 102 nor the mobile node 104 are registered on the visitor list maintained by the FA 120, and the time that the mobile nodes 102 and 104 are able to exchange packet data via each other's home agents.

To begin, at step 500, the mobile node 104 sends a Mobile IP Registration Request to the FA 120. Prior to that, the mobile node 104 acquired access to wireless resources and established a PPP connection with the PDSN/FA 120, in the manner known in the art. Next, at step 502, the FA 120 transmits the registration request to the HA 124, which, here, is the HA for both of the mobile nodes 102 and 104. Upon approving the request, the HA 124 stores a mobility binding associating the home address of the mobile node 104 with the IP address of the FA 120. At step 504, the HA 124 transmits a Mobile IP Registration Reply to the FA 120, indicating success. The FA 120 then stores the home address of the mobile node 104 in its visitor list and, at step 506, sends the registration reply to the mobile node 104, to convey the successful registration.

At steps 508-514, the mobile node 102 undergoes a similar registration process. The HA 124 will thus also store a mobility binding associating the home address of the mobile node 102 with the IP address of the FA 120. The HA 124 may assign a home address to the mobile node 104 (such as "a.b.c.f") and to the mobile node 102 (such as "a.b.c.d") at the time of registration. The HA 124 would associate each mobile node's assigned address with the IP address of the FA 120 ("w.x.y.z"). Thus, the HA 124 would tunnel packets addressed to "a.b.c.f" to "w.x.y.z". These packets would first be routed to the HA 124 due to the HA 124's address ("a.b.c.x") having the same network prefix as the home addresses of the mobile nodes 102 and 104.

Once the mobile nodes 102 and 104 are registered in the visitor list of the FA 120, they are able to send and receive packets. So, for example, at step 516, the mobile node 102 transmits an HTTP request to the mobile node 104, labeling the packet header with the mobile node 104's home address ("a.b.c.f") as the IP Destination Address. The FA 120, not having implemented direct routing, at step 518, transmits the HTTP request out over the Internet, where it is routed to the HA 124. The HA 124 checks its mobility bindings and, at step 520, tunnels the packet back to the FA 120, due to the "w.x.y.z" address stored in the mobility binding for the mobile node 104. At step 522, the FA 120 sends the HTTP request to the mobile node 104.

Steps 524-530 show a similar sequence occurring when the mobile node 104 sends an HTTP response to the mobile node 102. The FA 120 sends the packet to the HA 124, which sends it right back to the FA 120, which then delivers it to the mobile node 102. Because both of the mobile nodes 102 and 104 are registered on the FA 120's visitor list, steps 518, 520, 526, and 528, as well as all associated processing, are unnecessary and therefore inefficient to carry out.

ii. Example Call Flow Where Direct Routing is Implemented

Figure 6:
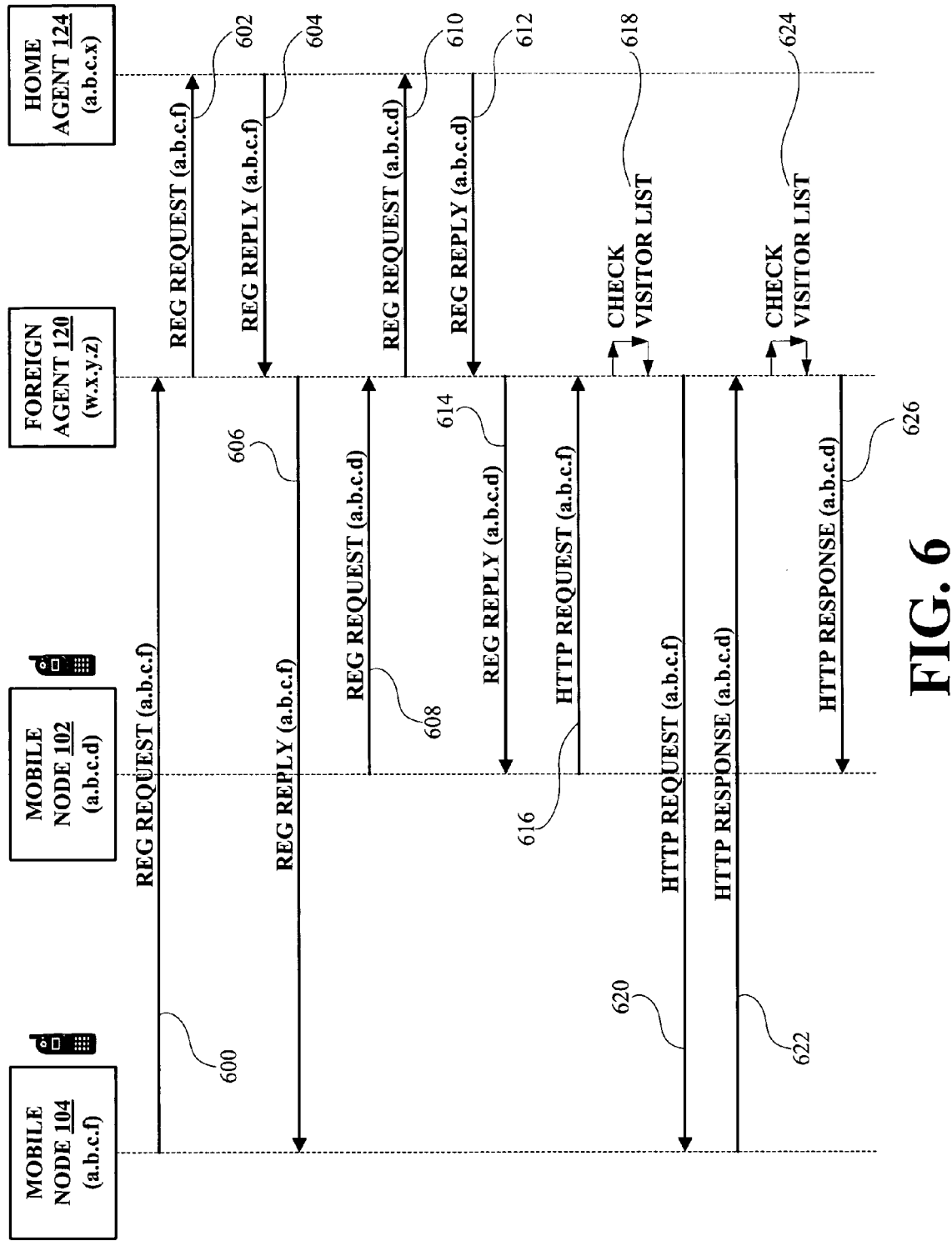
FIG. 6 is a call flow diagram, in accordance with examples of embodiments, illustrating an example of the messaging and processing that could occur if direct routing were implemented.

FIG. 6 is a call flow diagram, in accordance with examples of embodiments, illustrating an example of the messaging and processing that could occur if direct routing were implemented. In the call flow of FIG. 6, steps 600 to 614 match that of steps 500 to 514 of FIG. 5. Thus, following step 614, both the mobile node 102 and the mobile node 104 are registered in the visitor list maintained by the FA 120. And, the HA 124 is storing a mobility binding for each of the mobile nodes 102 and 104, associating the home address of each with the IP address of the FA 120. Thus, if the corresponding node 128 of FIG. 1 transmitted a packet to the mobile node 104, it would be routed to that mobile node via the HA 124 and the FA 120, as explained above.

Differences occur, however, when the mobile nodes 102 and 104 transmit packet data to each other. So, for example, at step 616, the mobile node 102 transmits a packet representing an HTTP request, addressed to the mobile node 104's home IP address, similar to the request sent in step 516 of FIG. 5. Here, however, at step 618, the FA 120 checks its visitor list, and determines that it contains an entry corresponding to the mobile node 104's home IP address. In other words, the FA 120 finds a match between (i) the Destination IP Address of the packet transmitted by the mobile node 102 at step 616 and (ii) an entry on the FA 120's visitor list.

In response to identifying this match, at step 620, the FA 120 transmits the packet representing the HTTP request to the mobile node 104 along a communication path that does not include the HA 124. More particularly, the FA 120 transmits the packet to the mobile node 104 by simply using the PPP connection that had earlier been established between the PDSN/FA 120 and the mobile node 104. Similarly, when, at step 622, the mobile node 104 sends an IP packet representing an HTTP response, addressed to the home IP address of the mobile node 102, the FA 120 again, upon receipt of the packet, at step 624, checks its visitor list for the mobile node 102's home IP address. Since mobile node 102 is currently registered with the FA 120, the FA 120 transmits, at step 626, the HTTP response packet to the mobile node 102 over the PPP connection that the PDSN/FA 120 had previously established with the mobile node 102.

Thus, reduced (i) delivery time, (ii) congestion between the FA 120 and the HA 124, (iii) congestion at the HA 124 itself, and (iv) processing by the HA 124 are easily observable. The messaging and processing associated with steps 518 and 520, as well as steps 526 and 528, are obviated by the implementation of direct routing.

4. Conclusion

Various examples of embodiments have been described above. Those skilled in the art will understand, however, that changes and modifications may be made to those examples without departing from the scope of the claims.

The invention claimed is:

1. A method comprising:
   receiving at least one Internet Protocol (IP) packet into a foreign agent from a first mobile node registered in a visitor list maintained by the foreign agent, the at least one packet including an indication of an intended destination of the at least one packet;
   checking whether the intended destination is a second mobile node that is also registered in the visitor list; and
   if the intended destination is a second mobile node that is also registered in the visitor list, then sending the at least one packet to the second mobile node over a communication path that does not include a home agent associated with the second mobile node.

2. The method of claim 1, wherein the foreign agent is situated in a packet data serving node.

3. The method of claim 1, wherein the first mobile node or the second mobile node is a cellular telephone, a personal digital assistant, a computer, a desktop computer, a laptop computer, a second foreign agent, a router, or a wireless router.

4. The method of claim 1, wherein the indication of the intended destination of the at least one packet is located in at least one packet header.

5. The method of claim 1, wherein the indication of the intended destination of the at least one packet is at least one IP address.

6. The method of claim 1, wherein the communication path is coextensive with a point-to-point protocol connection extending between the foreign agent and the second mobile node.

7. A computer-readable storage medium comprising instructions executable by a processor to carry out the method of claim 1.

8. A foreign agent comprising:
a network interface;
a processor; and
a data storage comprising a visitor list and program instructions executable by the processor to:
receive at least one Internet Protocol (IP) packet via the network interface from a first mobile node registered in the visitor list, the at least one packet including an indication of an intended destination of the at least one packet;
check whether the intended destination is a second mobile node that is also registered in the visitor list; and
if the intended destination is a second mobile node that is also registered in the visitor list, then send the at least one packet via the network interface to the second mobile node over a communication path that does not include a home agent associated with the second mobile node.

9. The foreign agent of claim 8, wherein the foreign agent is situated in a packet data serving node.

10. The foreign agent of claim 8, wherein the first mobile node or the second mobile node is a cellular telephone, a personal digital assistant, a computer, a desktop computer, a laptop computer, a second foreign agent, a router, or a wireless router.

11. The foreign agent of claim 8, wherein the indication of the intended destination of the at least one packet is located in at least one packet header.

12. The foreign agent of claim 8, wherein the indication of the intended destination of the at least one packet is at least one IP address.

13. The foreign agent of claim 8, wherein the communication path is coextensive with a point-to-point protocol connection extending between the foreign agent and the second mobile node.

14. A method of routing Internet Protocol (IP) packets in a communications system comprising a foreign agent and a plurality of mobile nodes, each mobile node being associated with one of a plurality of home agents, the method comprising:
receiving at least one IP packet into the foreign agent from a first one of the mobile nodes, the first mobile node being registered in a visitor list maintained by the foreign agent, the at least one packet including an indication of an intended destination of the at least one packet, the intended destination being a second one of the mobile nodes;
checking whether the second mobile node is also registered in the visitor list;
if the second mobile node is also registered in the visitor list, then sending the at least one packet to the second mobile node over a communication path that does not include the home agent associated with the second mobile node; and
if the second mobile node is not registered in the visitor list, then sending the at least one packet to the home agent associated with the second mobile node.

15. The method of claim 14, wherein the foreign agent is situated in a packet data serving node.

16. The method of claim 14, wherein the first mobile node or the second mobile node is a cellular telephone, a personal digital assistant, a computer, a desktop computer, a laptop computer, a second foreign agent, a router, or a wireless router.

17. The method of claim 14, wherein the indication of the intended destination of the at least one packet is located in at least one packet header.

18. The method of claim 14, wherein the indication of the intended destination of the at least one packet is at least one IP address.

19. The method of claim 14, wherein the communication path is coextensive with a point-to-point protocol connection extending between the foreign agent and the second mobile node.

20. A computer-readable storage medium comprising instructions executable by a processor to carry out the method of claim 14.

21. A method comprising:
receiving at a foreign agent for a foreign network an Internet Protocol (IP) packet sent from a first mobile node to a second mobile node, wherein both the first and second mobile nodes are visiting the foreign network;
determining that the second mobile node is visiting the foreign network; and
routing the packet to the second mobile node over a communication path that does not include a home agent associated with the second mobile node.

22. The method of claim 21, wherein the foreign agent is situated in a packet data serving node.

23. The method of claim 21, wherein the first mobile node or the second mobile node is a cellular telephone, a personal digital assistant, a computer, a desktop computer, a laptop computer, a second foreign agent, a router, or a wireless router.

24. The method of claim 21, wherein the packet includes in a packet header an indication that the intended destination of the packet is the second mobile node.

25. The method of claim 21, wherein the packet includes an IP address indicating that the intended destination of the packet is the second mobile node.

26. The method of claim 21, wherein the communication path is coextensive with a point-to-point protocol connection extending between the foreign agent and the second mobile node.

27. A computer-readable storage medium comprising instructions executable by a processor to carry out the method of claim 21.

28. The method of claim 21, wherein determining that the second mobile node is visiting the foreign network comprises determining whether a visitor list maintained by the foreign agent includes an entry corresponding to the second mobile node.

29. A method comprising:
receiving at a foreign agent for a foreign network an Internet Protocol (IP) packet sent from a first mobile node, the first mobile node being registered as a visitor on the foreign network, the packet being addressed to a second mobile node;
if the second mobile node is also registered as a visitor on the foreign net routing the packet to the second mobile node over a communication path that does not include a home agent associated with the second mobile node; and if the second mobile node is not registered as a visitor on the foreign network, then routing the packet to the home agent associated with the second mobile node.

30. The method of claim 29, wherein the foreign agent is situated in a packet data serving node.

31. The method of claim 29, wherein the first mobile node or the second mobile node is a cellular telephone, a personal digital assistant, a computer, a desktop computer, a laptop computer, a second foreign agent, a router, or a wireless router.

32. The method of claim 29, wherein the packet being addressed to the second mobile node comprises the packet including in a packet header an indication that the intended destination of the packet is the second mobile node.

33. The method of claim 29, wherein the packet being addressed to the second mobile node comprises the packet including an IP address indicating that the intended destination of the packet is the second mobile node.

34. The method of claim 29, wherein the communication path is coextensive with a point-to-point protocol connection extending between the foreign agent and the second mobile node.

35. A computer-readable storage medium comprising instructions executable by a processor to carry out the method of claim 29.

* * * * *